United States Patent
Mönkedieck

(10) Patent No.: US 10,627,278 B2
(45) Date of Patent: Apr. 21, 2020

(54) HYDROSTATIC METERING SYSTEM AND METHOD FOR METERING FLUIDS BY USING SUCH A METERING SYSTEM

(71) Applicant: Hans-Jürgen Keil Anlagenbau GmbH & Co. KG, Bohmte-Hunteburg (DE)

(72) Inventor: Jürgen Mönkedieck, Rahden-Sielhorst (DE)

(73) Assignee: Hans-Jürgen Keil Anlagenbau GmbH & Co. KG, Bohmte-Hunteburg (DE)

( * ) Notice: Subject to any disclaimer, the term of this patent is extended or adjusted under 35 U.S.C. 154(b) by 225 days.

(21) Appl. No.: 15/560,945

(22) PCT Filed: Mar. 22, 2016

(86) PCT No.: PCT/EP2016/056279
§ 371 (c)(1),
(2) Date: Sep. 22, 2017

(87) PCT Pub. No.: WO2016/150976
PCT Pub. Date: Sep. 29, 2016

(65) Prior Publication Data
US 2018/0052026 A1    Feb. 22, 2018

(30) Foreign Application Priority Data
Mar. 23, 2015    (DE) .................. 10 2015 003 568

(51) Int. Cl.
*G01F 11/28* (2006.01)
*B01J 4/02* (2006.01)

(52) U.S. Cl.
CPC .............. *G01F 11/28* (2013.01); *B01J 4/02* (2013.01)

(58) Field of Classification Search
CPC ................... G01F 11/28; B01J 4/02
See application file for complete search history.

(56) References Cited

U.S. PATENT DOCUMENTS 3,273,402 A * 9/1966 Farr ............... B01L 3/0206
                                                       137/860
4,284,210 A * 8/1981 Horak ............. B67D 7/08
                                                       222/14
(Continued)

FOREIGN PATENT DOCUMENTS

DE    36 30 078 A1    3/1988
DE    103 34 857 A1   3/2005
(Continued)

OTHER PUBLICATIONS

Office Action dated Sep. 26, 2017 for corresponding European Patent Application No. 16712795.0.
(Continued)

*Primary Examiner* — Timothy L Maust
(74) *Attorney, Agent, or Firm* — Thomas B. Ryan; Brian B. Shaw, Esq.; Harter Secrest & Emery LLP

(57) ABSTRACT

The invention relates to a hydrostatic metering system (10), in particular for metering fluids in mixing systems, comprising at least one metering pipe (11), a pressure sensor (13), which is arranged at a base part (12) of the metering pipe (11), an inlet valve (22), by means of which the fluid can be fed to the metering pipe (11), and a metering valve (14), by means of which the fluid can be discharged from the metering pipe (11). Furthermore, the invention relates to a method for metering fluids by using the hydrostatic metering system (10).

20 Claims, 1 Drawing Sheet

(56) References Cited

U.S. PATENT DOCUMENTS

| | | | | |
|---|---|---|---|---|
| 4,450,981 | A | * | 5/1984 | Haig .................. B65B 3/14 |
| | | | | 137/209 |
| 4,597,507 | A | * | 7/1986 | Rosenblum .......... G01F 11/284 |
| | | | | 222/16 |
| 5,556,002 | A | | 9/1996 | Green |
| 5,742,523 | A | | 4/1998 | Thomas et al. |
| 8,690,417 | B2 | | 4/2014 | Graf et al. |
| 9,522,380 | B2 | * | 12/2016 | Herman .................. B01J 19/126 |
| 2002/0011276 | A1 | | 1/2002 | Sander |
| 2014/0374238 | A1 | | 12/2014 | Herman et al. |

FOREIGN PATENT DOCUMENTS

| | | |
|---|---|---|
| DE | 10 2009 014 363 A1 | 9/2010 |
| EP | 0 660 091 A1 | 6/1995 |
| EP | 1 150 105 A2 | 10/2001 |
| EP | 2 823 884 A2 | 1/2015 |
| FR | 2 767 206 A1 | 2/1999 |

OTHER PUBLICATIONS

English Translation of International Preliminary Report on Patentability dated Oct. 5, 2017 for Internaitonal Application No. PCT/EP2016/056279.

International Search Report (English) for PCT/EP2016/056279 dated Jun. 24, 2016.

International Written Opinion for PCT/EP2016/056279 logged on Patentscope dated Sep. 29, 2016.

* cited by examiner

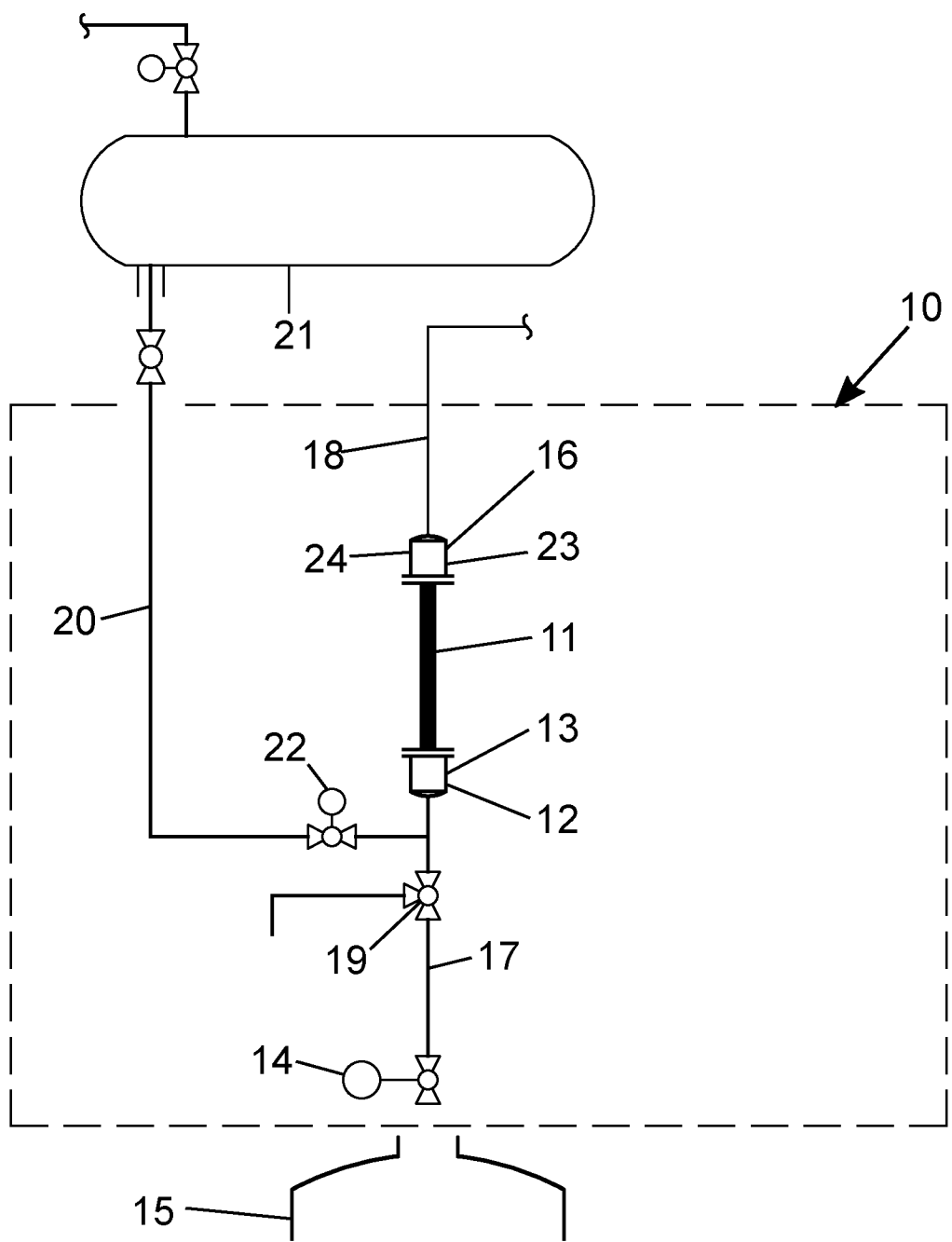

HYDROSTATIC METERING SYSTEM AND METHOD FOR METERING FLUIDS BY USING SUCH A METERING SYSTEM

TECHNICAL FIELD

The invention relates to a hydrostatic metering system, in particular for metering fluids in mixing systems. Furthermore, the invention relates to a method for metering fluids by using the hydrostatic metering system.

BACKGROUND OF THE INVENTION

Metering systems are used, in particular, for so-called batch metering processes in the chemical industry, which are used primarily for the production of plastics or paints and varnishes, but also in food technology and pharmaceutical technology. For the exact matching of the individual formulation components, metering of the fluids as exactly as possible is required. Furthermore, considering aspects of process engineering and procedural economy, it is useful to be able to meter several formulation components simultaneously.

From DE 10 2009 014 363 A1, a system for the intermittent production of a resin-filler mixture is known. For gravimetric metering, the system has a weighing device connected to a mixing pot and a control device. During the metering process, the metering quantity is monitored by means of the weighing device. The control device terminates the metering as soon as the desired metering quantity has been reached.

It is an object of the present invention to improve prior art metering systems with regard to the metering accuracy and the simultaneous metering of several components.

To achieve this object, a hydrostatic metering system with the features of claim 1 and a method for metering fluids according to claim 12 are proposed. Advantageous embodiments are subject matter of the respective dependent claims.

SUMMARY OF THE INVENTION

The metering system according to the invention comprises at least one metering pipe, a pressure sensor, which is arranged at a base part of the metering pipe, an inlet valve by means of which the fluid can be fed to the metering pipe, and a metering valve by means of which the fluid can be discharged from the metering pipe. The pressure sensor arranged at the base part meters the hydrostatic pressure of the fluid head in the metering pipe acting on it. The hydrostatic pressure metered this way is proportional to the mass of the fluid so that a conversion using the density, as it is necessary, for instance, in volumetric metering processes, and no errors of measurement related to this conversion occur. Moreover, such metering pipes are largely insensitive to vibrations and shocks and offer a simple and cost-efficient solution.

The fluid is fed to the metering pipe before metering and is discharged from the metering pipe by means of the metering valve during metering. In particular, depending on the application, it may be advantageous to provide several metering pipes in the metering system in order to be able to meter several components simultaneously.

The metering pipe can also be provided with a double jacket and can be connected to a heating or cooling system if this is necessary from a process engineering viewpoint or for improving flow characteristics. When heating is required, it is also possible to provide electrical heating systems.

The metering pipe has a top part with a pressure sensor. This is particularly advantageous in applications in which the metering medium has to be covered with a gas cushion for inertisation, for protection against oxygen contact, or for discharge aid in case of poor flow characteristics. In this way, the metering quantity can be determined by means of the pressure difference between the pressure sensor in the top part and the pressure sensor in the base part.

The top part is preferably formed identical to the base part. Alternatively or in addition to the pressure sensor, the top part may have a filling level sensor for avoiding an overfilling of the metering pipe. In general, the top and base part serve, in particular, to receive sensors, to connect lines, and to connect the actual metering pipe section.

Advantageously, the metering pipe is designed as a replaceable pipe fitting made of stainless steel. This makes possible, in particular, an optimal adaptation of the length of the metering pipe to the metering range of the pressure sensor in the base part and the diameter of the metering pipe to the predetermined metering quantity. In addition, the replaceable pipe fittings can be easily removed and reinserted for purposes of cleaning or adjusting the metering system. In the case of critical fluid properties, the metering pipe can alternatively be formed from other fluid-resistant materials such as plastic, glass, internally coated steel pipe fittings or steel metering pipe with enhanced surface quality.

Advantageously, the metering valve is designed as a two-stage valve. Such a two-stage valve can be switched between coarse-flow metering and fine-flow metering. Thereby, the metering speed can be optimally adapted to the current state during the metering process by carrying out a coarse flow metering with a high mass current until a predefined switching point is reached, for instance 95% of the metered quantity, in order to shorten the metering times. When the predefined switching point is reached, the two-stage valve is switched so that a fine-flow metering process is carried out, by means of which a far more precise metering is possible.

In an advantageous embodiment, the inlet valve is connected to a supply line. The supply line serves for easier filling of the metering pipe from transport containers or storage tanks. The inlet valve is opened to fill the metering pipe and is closed as soon as the desired filling quantity is reached in the metering pipe. The filling of the metering pipe is preferably executed from below, in order to carry it out as steadily as possible and with a low amount of splatter.

In an advantageous embodiment, the supply line is connected to a buffer vessel arranged in the vertical direction above the at least one metering pipe. The buffer vessel facilitates continuous metering, which facilitates further simplification and automation of the processes.

Advantageously, the metering valve is arranged in an outlet line, which is connected to the base part. The fluid may be discharged through the outlet line during metering.

In an advantageous embodiment, the outlet line has a switching valve for taking samples. Thus the correct function of the metering can be checked, which can be necessary especially during start-up or maintenance.

Advantageously, the hydrostatic metering system has an exhaust air duct through which displaced air can escape. The air can be discharged into the environment or into an exhaust gas network, for instance. Likewise, the exhaust air duct also serves for the after-flow of air during the metering process. Finally, the exhaust air system may be connected to a peripheral vacuum system by means of which the fluid can be sucked into the metering pipe during the filling process.

Preferably, the exhaust-side pipe system can be provided with automatic valves, through which ventilation of the metering system can be controlled by means of a system control.

In an advantageous embodiment, the at least one metering pipe is vertically aligned, as a result of which the metering process and the exact metering of the hydrostatic pressure are enhanced.

Advantageously, the hydrostatic metering system includes a plant section, in particular a mixing vessel, the plant section being arranged in the vertical direction below the at least one metering pipe. As a result of this, the metered fluid can escape directly into the plant section.

Furthermore, the hydrostatic metering system may be connected to a peripheral flushing system if regular cleaning is desired or required for hygiene reasons.

A method for metering fluids by using the metering system according to the invention comprises the following method steps:
a) filling a metering pipe by means of the inlet valve;
b) closing the inlet valve when the metering pipe is filled;
c) opening the metering valve while continuously metering the filling level by means of the pressure sensor;
d) closing the metering valve as soon as the pressure sensor signals a desired amount of liquid.

The filling of the metering pipe is usually carried out in such a way that it is completely filled with fluid. The inlet valve is then closed to avoid overfilling. As a rule, the filling level control is ensured by means of the hydrostatic pressure sensor in the base part of the metering pipe. Alternatively, however, a filling level sensor can also be provided in the top part of the metering pipe. During metering, the pressure sensor monitors the level of the fluid head in the metering pipe and thereby continuously monitors the metering. As soon as the desired metering quantity has been reached, the metering valve is closed and thus the metering process is terminated.

Advantageously, the metering valve is opened in coarse-flow metering in step (c) and is switched to fine-flow metering upon reaching a predefined switching point. As a result, during the metering process the metering speed can be optimally adapted to the current state by controlling the mass flow, so that metering can take place in the shortest possible period, but nevertheless as precisely as possible.

Advantageously, filling of the metering pipe in step (a) is executed through the supply line.

The described method for metering fluids using the metering system can be carried out fully automatically, in particular by means of a system control. This also allows for a high degree of automation and a precise and fast handling of the process steps, and thus the system can be used in processing plants of industrial scale.

BRIEF DESCRIPTION OF THE DRAWING FIGURE

Below, the invention is explained in more detail with reference to an exemplary embodiment which is schematically illustrated in the drawing.

FIG. 1 shows a hydrostatic metering system according to one exemplary embodiment.

DETAILED DESCRIPTION OF THE INVENTION

The hydrostatic metering system 10 illustrated schematically in FIG. 1 comprises a metering pipe 11 with a base part 12 and a top part 16. A hydrostatic pressure sensor 13 is arranged at the base part 12. The metering pipe 11 is designed as a replaceable pipe fitting, in particular made of stainless steel. This makes it possible to optimally adjust the length of the metering pipe 11 to the metering range of the pressure sensor 13 in the base part 12 and the diameter of metering pipe 11 to the predetermined metering quantity. In addition, the replaceable pipe fittings can be easily removed and reinserted for purposes of cleaning or adjusting the metering system. In the case of critical fluid properties, the metering pipe 11 can alternatively be formed from plastic, internally coated steel pipe fittings or steel pipe fittings with an enhanced surface quality.

Furthermore, an outlet line 17 is connected to the base part. The outlet line 17 has a metering valve 14 through which the fluid can be discharged from the metering pipe 11, and a switching valve 19 for taking metering samples from the outlet line 17. Below the metering pipe 11 and the outlet line 17 including the metering valve 14 a plant section 15 is disposed into which the fluid is discharged.

A supply line 20 with an inlet valve 22 is connected to the outlet line 17. At its other end, the supply line 20 can be connected to a buffer vessel 21.

As shown in FIG. 1, a pressure sensor 23 and a filling level sensor 24 can be disposed at the top part 16. In addition, an exhaust air duct 18 is disposed at the top part 16.

In order to prepare the metering process, the fluid to be metered is filled into the buffer vessel 21. The buffer vessel 21 is usually arranged in such a way that it is arranged above the metering pipe 11 in order to facilitate the filling of the metering pipe 11. Alternatively, the buffer vessel 21 may be dispensed with, but the buffer vessel 21 simplifies the automatic refilling of the metering pipe 11 and thus the industrial application. When the inlet valve 22 is opened, the fluid is fed to the metering pipe 11 through the supply line 20. When the desired filling level is reached in the metering pipe 11—it usually is completely filled—the inlet valve 22 is closed.

The filling level in the metering pipe 11 is monitored by the hydrostatic pressure sensor 13, that is, during the filling of the metering pipe 11 and during metering. The hydrostatic pressure of the fluid head in the metering pipe 11 acts on the pressure sensor 13 in the base part 12 of the metering pipe 11 and is directly proportional to the mass of the fluid. Thus, a simple and reliable metering of the mass of the fluid is possible via the pressure metering without a density conversion being required or without fluctuations occurring due to temperature-dependent specific density, gas bubbles, or foam formation.

The correct filling can additionally be monitored by the filling level sensor 24 disposed in the top part 16. The pressure sensor 23 serves to determine the metering quantity by means of the pressure difference between the pressure sensor 23 in the top part 16 and the pressure sensor 13 in the base part 12. However, depending on the application, the pressure sensor 23 and the filling level sensor 24 can be dispensed with.

The displaced air can escape through the exhaust air duct 18 connected to the top part 16 when filling the metering pipe 11. The air can be discharged, for instance, into the environment or into an exhaust gas network (not shown here). Likewise, the exhaust air duct 18 also serves for the after-flow of air during the metering process.

At the start of the metering process, the metering valve 14 is opened, so that the fluid can be discharged from the filled metering pipe 11 through the outlet line 17 into the plant section 15. For faster and yet more precise metering, the metering valve 14 is designed as a two-stage valve so that it can be switched between coarse-flow and fine-flow metering. The fluid initially flows relatively quickly from the metering pipe 11 through the metering valve 14 into the plant section 15 and then, after switching from coarse-flow metering to fine-flow metering, it flows significantly more slowly in order to end the metering exactly. When the desired metering quantity is reached, the metering valve 14 is closed so that no more fluid can escape from the metering pipe 11.

During start-up of the system or for maintenance purposes, it may be necessary to take metering samples. For this purpose, the valve 19 is opened in order to discharge the metered quantity from the outlet line 17.

LIST OF REFERENCE SIGNS 10 metering system
11 metering pipe
12 base part
13 pressure sensor
14 metering valve
15 plant section
16 top part
17 outlet line
18 exhaust air duct
19 switching valve
20 supply line
21 buffer vessel
22 inlet valve
23 pressure sensor
24 filling level sensor

The invention claimed is:

1. A hydrostatic metering system for metering fluids in mixing systems, the hydrostatic metering system comprising:
    a) at least one hydrostatic metering pipe having a first end and a second end;
    b) a top part having a replaceable connection to the first end of the hydrostatic metering pipe;
    c) a base part having a replaceable connection to the second end of the hydrostatic metering pipe;
    d) a first pressure sensor in the base part;
    e) an inlet valve through which the fluid can be fed to the hydrostatic metering pipe;
    f) a metering valve through which the fluid can be discharged from the hydrostatic metering pipe; and
    g) a second pressure sensor in the top part;
    wherein the hydrostatic metering pipe is configured as a replaceable part made of fluid resistant material.

2. The hydrostatic metering system of claim 1 in which the hydrostatic metering pipe is configured as a replaceable pipe fitting made of a fluid-resistant material.

3. The hydrostatic metering system of claim 1 in which the metering valve is configured as a two-stage valve.

4. The hydrostatic metering system of claim 1 in which the inlet valve is connected to a supply line.

5. The hydrostatic metering system of claim 4 in which the supply line is connected to a buffer vessel disposed in a vertical direction above the at least one hydrostatic metering pipe.

6. The hydrostatic metering system of claim 1 in which the metering valve is disposed in an outlet line which is connected to the base part.

7. The hydrostatic metering system of claim 6 in which the outlet line has a switching valve for taking samples.

8. The hydrostatic metering system of claim 1, further comprising an exhaust air duct through which displaced air can escape.

9. The hydrostatic metering system of claim 1, in which the at least one hydrostatic metering pipe is arranged vertically.

10. The hydrostatic metering system of claim 1, further comprising a plant section, the plant section being disposed in a vertical direction below the at least one hydrostatic metering pipe.

11. A method for metering fluids using the hydrostatic metering system of claim 1, comprising the steps of:
    a) filling a hydrostatic metering pipe by means of the inlet valve;
    b) closing the inlet valve when the hydrostatic metering pipe is filled;
    c) opening the metering valve while continuously metering the filling level by means of the pressure sensor; and
    d) closing the metering valve as soon as the pressure sensor signals a desired amount of liquid.

12. The method of claim 11 in which the metering valve is opened in step c) in coarse flow filling and that the hydrostatic metering valve is switched to fine flow filling when reaching a predefined switching point.

13. The method of claim 11 in which the filling of the hydrostatic metering pipe is executed in step a) through the supply line.

14. The method of claim 12 in which the filling of the metering pipe is executed in step a) through the supply line.

15. The hydrostatic metering system of claim 2 in which the fluid-resistant material is at least one of stainless steel, plastic, and glass.

16. The hydrostatic metering system of claim 10 in which the plant section includes a mixing vessel.

17. The hydrostatic metering system of claim 2 in which the inlet valve is connected to a supply line.

18. The hydrostatic metering system of claim 4 in which the hydrostatic metering valve is disposed in an outlet line which is connected to the base part.

19. The hydrostatic metering system of claim 5 in which the at least one metering pipe is arranged vertically.

20. The hydrostatic metering system of claim 5, further comprising a plant section, the plant section being disposed in a vertical direction below the at least one hydrostatic metering pipe.

* * * * *